Figure 1:
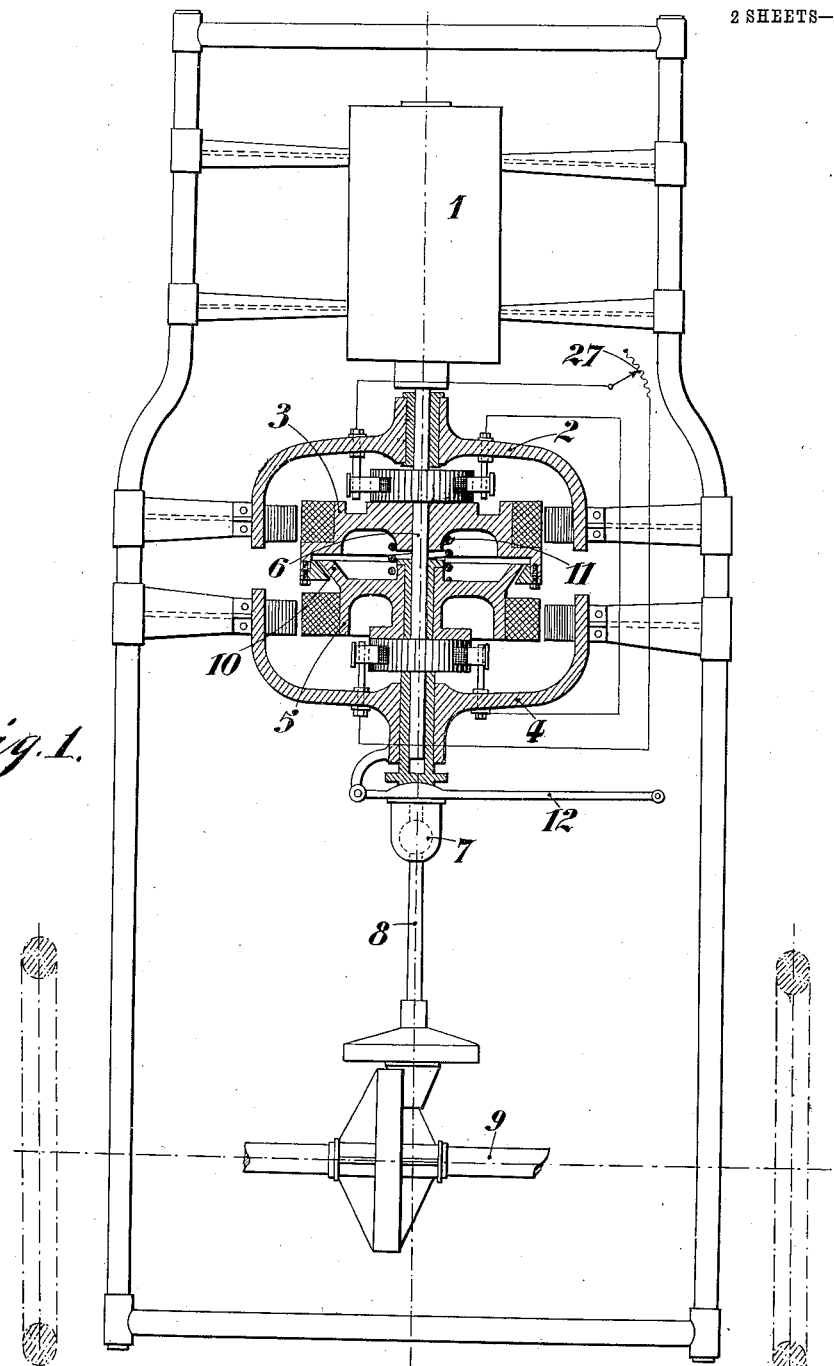

No. 848,494. PATENTED MAR. 26, 1907.
L. RENAULT.
SPEED CHANGING MECHANISM.
APPLICATION FILED APR. 28, 1904.

2 SHEETS—SHEET 1.

Witnesses:

Inventor
Louis Renault
By
James L. Norris.
Atty.

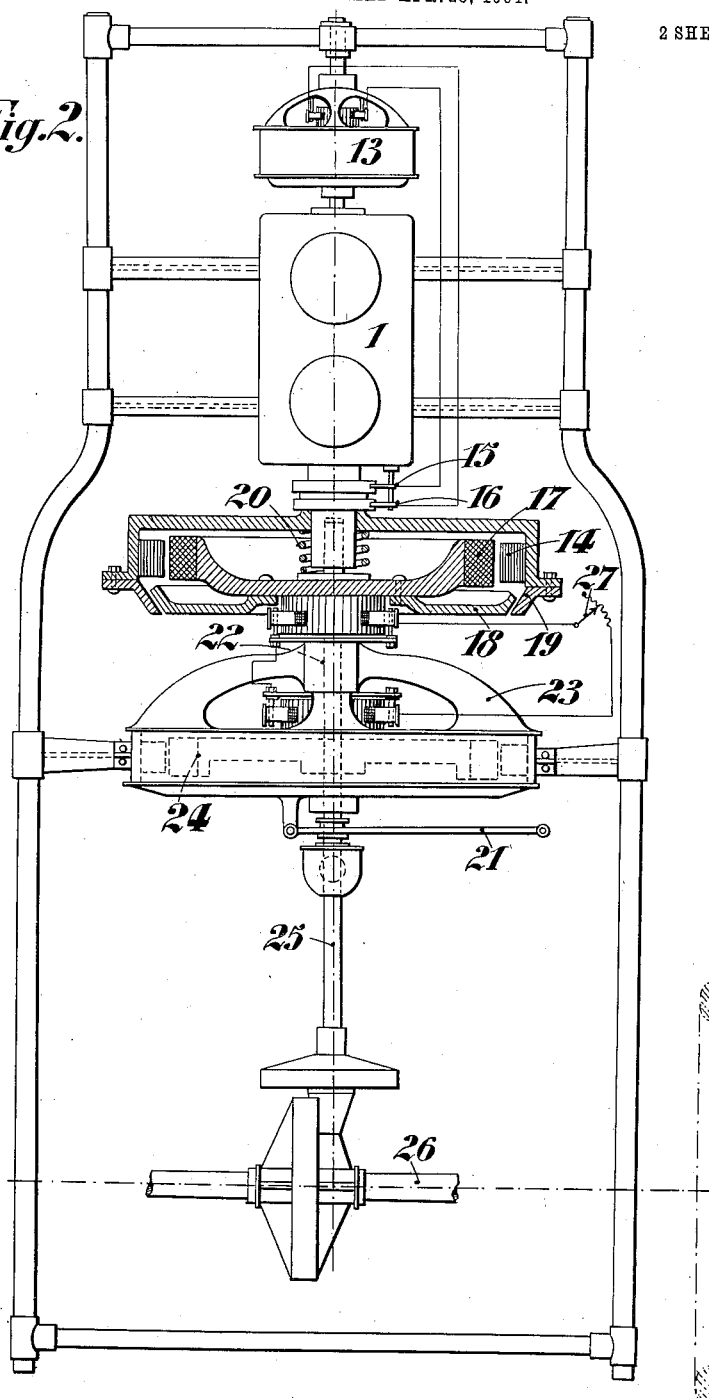

UNITED STATES PATENT OFFICE.

LOUIS RENAULT, OF BILLANCOURT, FRANCE.

SPEED-CHANGING MECHANISM.

No. 848,494.    Specification of Letters Patent.    Patented March 26, 1907.

Application filed April 28, 1904. Serial No. 205,419.

*To all whom it may concern:*

Be it known that I, LOUIS RENAULT, engineer, a citizen of the French Republic, residing at Billancourt, Department of Seine, France, have invented certain new and useful Improvements in Speed-Changing Mechanism, of which the following is a specification.

This invention has for its object a driving and speed-changing mechanism for motor-vehicles, in which the driving-shaft may be connected with the shaft to be driven either electrically or mechanically.

According to this invention the driving-shaft is electrically connected to the driven shaft for the reduced speeds; but for the greatest speed the electrical transmission is supplied with a mechanical one.

In the accompanying drawings, Figure 1 shows a mechanism according to this invention. Fig. 2 is a modification.

On the Fig. 1, 1 is the motor, 2 the fixed inductor of an electric dynamo, 3 its armature fixed on the shaft of the motor. The said armature 3 acts equally as a fly-wheel for the motor 1. 4 is the fixed inductor of an electric motor, the shaft 6 of which is an extension of the shaft of the motor 1. The inductors 2 and 4 are fixed to the frame of the carriage. The armature 5 of the electric motor turns loosely on the shaft 6. The socket carrying the armature 5 passes freely through the inductor 4 and is connected by means of a swivel-joint 7 to the shaft 8 to be driven. This shaft is in gear in a convenient manner with the driven wheels 9 of the vehicle. Between the armature 3 of the dynamo and the armature 5 of the motor a clutch 10 is provided allowing the armatures 3 and 5 being coupled together. If the armatures 3 and 5 are coupled together, the motive power is transmitted mechanically to the wheels, the electric transmission being dispensed with. The clutch 10 (shown on Fig. 1) is a friction-clutch in which the cone bears against the conical cup-shaped member by means of a spring 11. The cone and conical cup-shaped member are put into gear or thrown out of gear by means of the lever 12, allowing the armature to be moved along its axis. When the cone and conical cup-shaped member of the clutch 10 are thrown out of gear, the motor 1 is started.

The dynamo constituted by the inductor 2 and the armature 3 produces a current which may be sent through a controller in the electric motor constituted by the inductor 4 and the armature 5. The motor being set into rotation causes the shaft 8, and consequently the driven wheels of the vehicle, to be rotated. By varying the intensity of the current sent in the motor by means of the said controller the speed may be varied without a break. The backward running is obtained by reversing the poles.

In the mechanism shown in Fig. 1 the coupling is obtained by a friction-clutch and a lever 12.

The speed is varied by only acting on a controller 27, like those used in the electric tramways or vehicles, and the greatest speed is obtained by breaking the current between the dynamo and the motor.

Fig. 2 shows a modification in which 13 is a little dynamo rotated by the motor 1 and sending the electric exciting-current in the inductor 14 of a second dynamo, fixed on the shaft of the motor. The current is given to this inductor by two brushes 15 and 16, connected to the dynamo 13. In the inductor 14 is rotatively mounted the armature 17 of the dynamo. The said armature 17 carries the cone 18 of a friction-clutch, the conical cup-shaped member 19 of which being fixed to the inductor 14. A spring 20 causes the cone 18 to bear against the conical cup-shaped member 19. A lever 21 allows the shaft 22, on which is fixed the armature 17, to be moved longitudinally, and thus the clutch to be put into gear or thrown out of gear. The current produced by the dynamo constituted by the armature 17 and the inductor 14 is sent to an electric motor 23, the inductor of which is fixed to the frame of the vehicle. The armature 24 of the motor 23 is fixed on the shaft 22, which is connected, by means of a swivel-joint and shaft 25, to the driven wheels 26 of the vehicle. The mechanism works as follows: The vehicle being stopped and the motor 1 being put into rotation, the motor 1 causes the dynamo 13 and the inductor 14 to rotate. The armature 17 remains stationary. The rotation of the inductor 14 around the armature 17 produces a current which may be sent through a controller to the electric motor 23. The armature 24 of the motor 23 is thus caused to rotate, and with it the armature 17, the shaft 22, and consequently the driven wheels 26. A part of the power being taken up by the electric motor, the armature 17 tends to be brought into rotation by the inductor 14. In this mechanism the armatures 17 and 24, fixed on the shaft 22, act simultaneously for causing the shaft 25 of the vehicle to rotate.

The mechanisms hereinbefore described may be used with alternating-current motors or with direct-current motors and may be applied to other machines than motor-vehicles, for instance, to machine-tools.

Having thus described and ascertained the nature of my invention and in what manner the same may be performed, I declare that what I claim is—

1. A driving and speed-changing mechanism for motor-vehicles comprising a motor and its shaft, a dynamo embodying a stationary inductor and an armature fixed to and rotating with the shaft of the motor, said armature constituting a fly-wheel for the motor-shaft, a driven shaft provided with a socket in which extends the motor-shaft, an electric motor embodying a fixed inductor and an armature mounted on the driven shaft, a friction-clutch embodying two members, one of which is fixed to the armature of the dynamo and the other of which is fixed to the armature of the motor, and means for moving the members of the clutch into and out of engagement.

2. A driving and speed-changing mechanism for motor-vehicles comprising a motor and its shaft, a dynamo embodying a stationary inductor and an armature fixed to and rotating with the shaft of the motor, said armature constituting a fly-wheel for the motor-shaft, a driven shaft provided with a socket in which extends the motor-shaft, an electric motor embodying a fixed inductor and an armature mounted on the driven shaft, a friction-clutch embodying two members, one of which is fixed to the armature of the dynamo and the other of which is fixed to the armature of the motor, means for moving the members of the clutch into and out of engagement, and means for fixing the inductors to the frame of the vehicle.

In testimony whereof I have hereunto set my hand in presence of two subscribing witnesses.

LOUIS RENAULT.

Witnesses:
PAUL F. PÂQUET,
PIERRE LEINE.